United States Patent
Höche et al.

(10) Patent No.: US 10,704,621 B2
(45) Date of Patent: *Jul. 7, 2020

(54) METHOD FOR TRANSMITTING AND DAMPING TORQUES

(71) Applicant: ZF FRIEDRICHSHAFEN AG, Friedrichschafen (DE)

(72) Inventors: Tobias Höche, Hofheim i. UFr. (DE); Tobias Dieckhoff, Würzburg (DE); Daniel Lorenz, Bad Kissingen (DE); Andreas Orlamünder, Schonungen (DE); Ingrid Hoffelner, Knetzgau (DE); Wolfgang Grosspietsch, Schweinfurt (DE); Steffen Matschas, Bad Bocklet-Aschach (DE); Johannes Friess, Michelau im Steigerwald (DE); Christofer Ebert, Schweinfurt (DE); Matthias Kram, Würzburg (DE); Dennis Egler, Espenau (DE); Axel Rohm, Schonungen (DE); Erwin Wack, Niederwerrn (DE); Bernd Unseld, Ravensburg (DE); Thomas Dögel, Nüdlingen (DE); Matthias Reisch, Ravensburg (DE); Lukas Spath, Schonungen (DE); Angelika Ebert, Schonungen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

This patent is subject to a terminal disclaimer.

(21) Appl. No.: 16/313,446

(22) PCT Filed: May 29, 2017

(86) PCT No.: PCT/EP2017/062824
§ 371 (c)(1),
(2) Date: Dec. 26, 2018

(87) PCT Pub. No.: WO2018/001656
PCT Pub. Date: Jan. 4, 2018

(65) Prior Publication Data
US 2019/0162255 A1 May 30, 2019

(30) Foreign Application Priority Data

Jun. 30, 2016 (DE) .................. 10 2016 211 950

(51) Int. Cl.
*F16D 48/08* (2006.01)
(52) U.S. Cl.
CPC .... *F16D 48/08* (2013.01); *F16D 2500/30415* (2013.01); *F16D 2500/30426* (2013.01);
(Continued)

(58) Field of Classification Search
CPC .......... F16D 48/08; F16D 2500/30415; F16D 2500/30426; F16D 2500/50293;
(Continued)

(56) References Cited

U.S. PATENT DOCUMENTS

2017/0082156 A1* 3/2017 Kim .................. F16D 48/06
2018/0119757 A1* 5/2018 Kinch ................ F16D 48/066
(Continued)

FOREIGN PATENT DOCUMENTS

DE 195 49 259 3/1997
DE 196 12 455 10/1997
(Continued)

*Primary Examiner* — David J Hlavka
(74) *Attorney, Agent, or Firm* — Cozen O'Connor

(57) ABSTRACT

A method for the transmission and damping of a mean torque with a superposed alternating torque having an input and an output. The mean and superposed alternating torque is transmitted along a torque path from the input to the output area. An input speed is a mean speed and a super-
(Continued)

posed alternating component. A slip arrangement is provided in the torque path between the input and the output for transmitting the mean and superposed alternating torque and generating a speed slip between an input speed and an output speed. The slip arrangement provides a maximum of an external activation of the speed slip in a area of the maxima of at least one periodic oscillation component of the alternating component and provides a minimum of an external activation of the speed slip in an area of the minima of at least one periodic oscillation component of the alternating component.

12 Claims, 10 Drawing Sheets

(52) U.S. Cl.
CPC .............. *F16D 2500/50293* (2013.01); *F16D 2500/7044* (2013.01); *F16D 2500/70426* (2013.01); *F16D 2500/70689* (2013.01)

(58) Field of Classification Search
CPC ... F16D 2500/70426; F16D 2500/7044; F16D 2500/70689
See application file for complete search history.

(56) References Cited

U.S. PATENT DOCUMENTS

| | | | |
|---|---|---|---|
| 2019/0195298 A1* | 6/2019 | Hoche | ................ F16D 48/08 |
| 2019/0219111 A1* | 7/2019 | Hoche | ................ F16D 48/08 |

FOREIGN PATENT DOCUMENTS

| | | |
|---|---|---|
| DE | 198 23 766 | 12/1998 |
| DE | 10 2006 044 273 | 4/2008 |
| DE | 10 2008 009 135 | 8/2009 |
| DE | 10 2013 204 698 | 10/2013 |
| DE | WO 2015/070 851 | 5/2015 |

* cited by examiner

Fig. 3
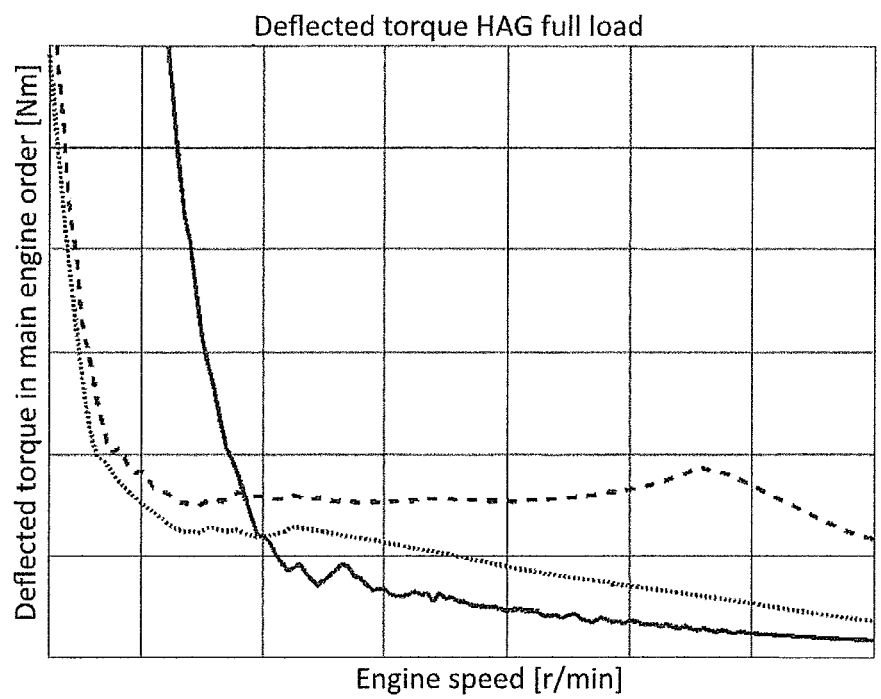
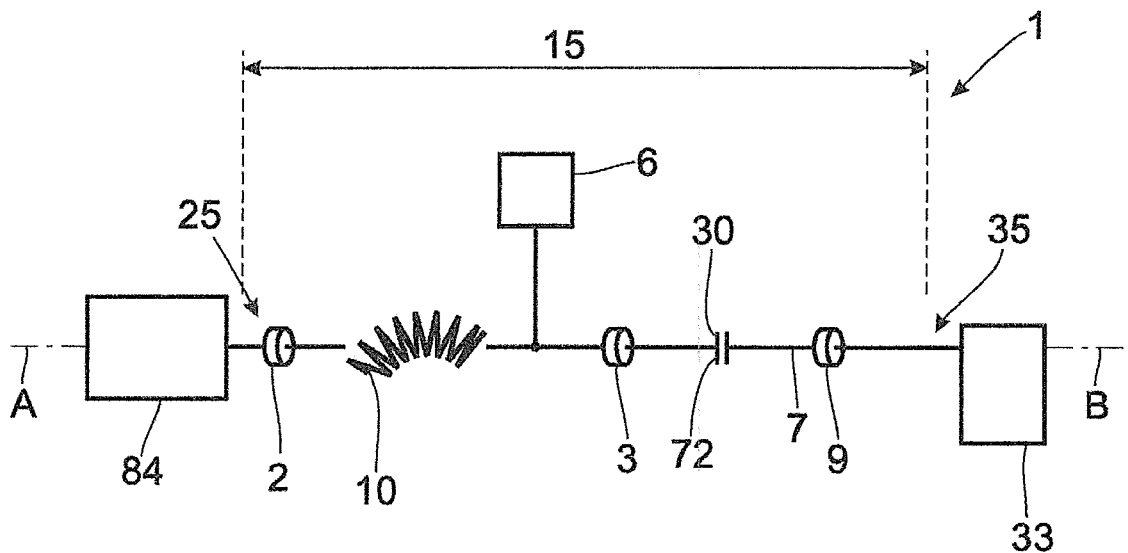
Fig.4

Fig. 5
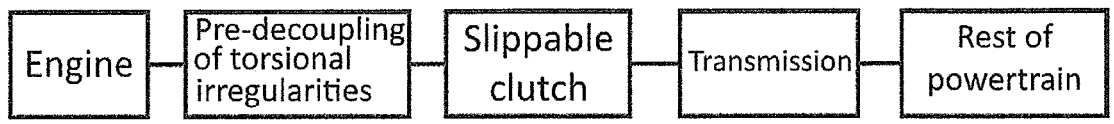
Fig. 6
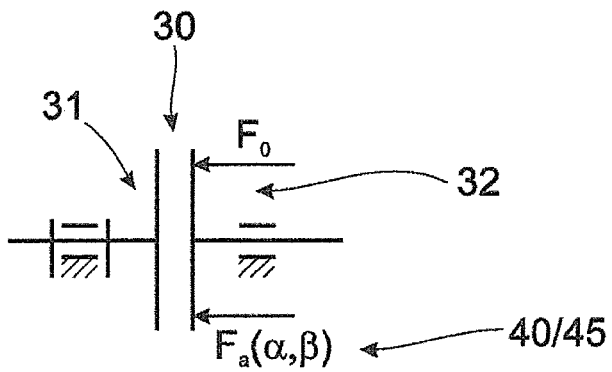
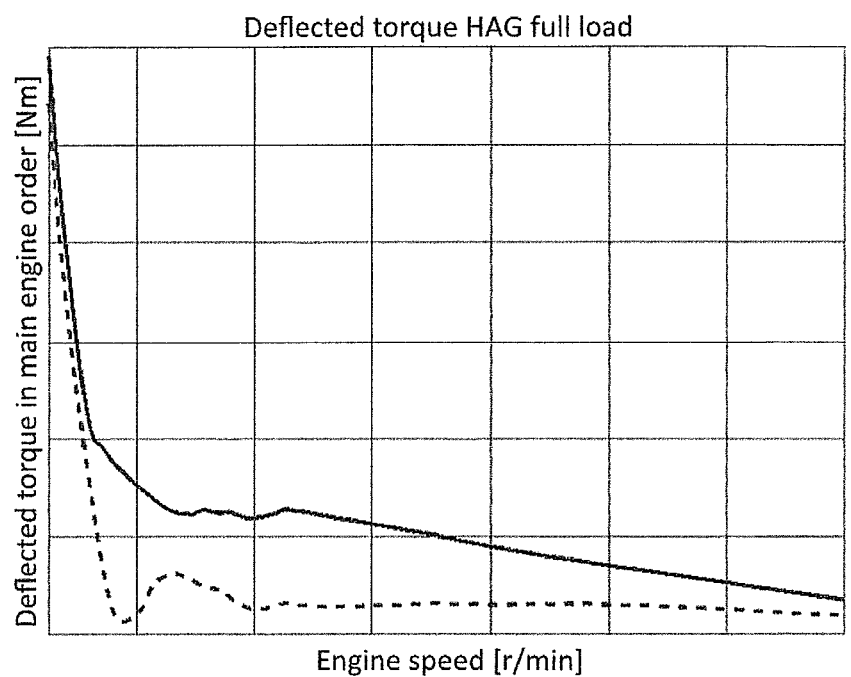
Fig. 7

Column 1          Column 2          Column 3

Line 1

Line 2

Line 3

METHOD FOR TRANSMITTING AND DAMPING TORQUES

CROSS REFERENCE TO RELATED APPLICATIONS

This is a U.S. national stage of application No. PCTEP2017/062824, filed on May 29, 2017. Priority is claimed on German Application No. DE102016211950.8, filed Jun. 30, 2016, the content of which is incorporated here by reference.

BACKGROUND OF THE INVENTION

1. Field of the Invention

The present invention is directed to a method for the transmission of and for the damping of a mean torque with a superposed alternating torque in a torque transmission arrangement for a powertrain of a motor vehicle with an input area and a downstream output area.

2. Description of the Prior Art

A method of the above type in a torque transmission arrangement for the powertrain of a motor vehicle is known from the prior art in DE 10 2008 009 135 A1. In this method, a friction clutch is provided between an internal combustion engine and a shiftable transmission, and the friction clutch is controlled such that a speed difference of a resonance speed range present at the friction clutch is reduced during startup to a greater extent than when not controlled.

It is disadvantageous in this prior art method that only the starting process and the shuddering known through the starting process are reduced. However, this method does not possess the capacity to damp torsional vibrations caused by the internal combustion engine and which occur in a constant driving state.

SUMMARY OF THE INVENTION

It is an object of one aspect of the present invention to provide a method for reducing torsional vibrations in a torque transmission device that effects an advantageous reduction in torsional vibrations chiefly after the starting process.

The invention is directed to a method for the transmission of and damping of a mean torque with a superposed alternating torque in a torque transmission arrangement for a powertrain of a motor vehicle comprising an input area, which is rotatable around a rotational axis (A), and an output area, which is rotatable around a rotational axis (B), wherein the mean torque with the superposed alternating torque is transmitted along a torque path from the input area to the output area, wherein the input area of the torque transmission arrangement rotates at an input speed around the rotational axis (A), and the output area of the torque transmission arrangement rotates at an output speed around the rotational axis (B), wherein at least the input speed is composed of a mean speed and a superposed alternating component, wherein the alternating component may be described approximately through a superposition of periodic speed oscillations whose frequencies have a substantially whole number ratio with the firing frequency, wherein each of these periodic oscillations has a minimum and a maximum, wherein a slip arrangement is provided in the torque path between the input area and the output area for transmitting the mean torque with the superposed alternating torque and for generating a speed slip between speed ne and speed na in the torque path, wherein the slip arrangement provides a maximum of an external activation of the speed slip in the area of the maxima of at least one periodic oscillation component of the alternating component and provides a minimum of an external activation of the speed slip in the area of the minima of at least one periodic oscillation component of the alternating component. Further torsional vibration damping units such as, for example, a first spring set and/or a second spring set and a damper unit can be arranged between the input area and the output area upstream of the slip arrangement. This is particularly advantageous because the alternating torques coming from the input area of an internal combustion engine, for example, are pre-filtered. The slip arrangement aims at reducing the remaining residual alternating torques, optimally even to zero. In order to achieve this, the method according to the invention provides that more slip is permitted in case a maximum external activation of the slip arrangement is carried out in the area of a maximum of a periodic oscillation of the superposed alternating torque and that less slip is permitted in case a minimum external activation of the slip arrangement is carried out in the area of a minimum of a periodic oscillation of the superposed alternating torque. This means that the slip arrangement that can be formed, for example, by a slip clutch or, by a multiple disk clutch, obtains a hydraulic signal from the external activation in the form of a lower hydraulic pressure, which can result in a reduced pressing force on the multiple disk clutch and can accordingly lead to increased slip, that is, an increase in the speed difference. In the case of slip reduction, the external activation should send a hydraulic signal to the slip clutch in such a way that, in this case, a hydraulic pressure is increased and the pressing force on the slip clutch is accordingly likewise increased, which leads to a reduction in slip in the slip clutch. The maximum in the superposed alternating torque can be counteracted in this way. The external activation for achieving the slip reduction and slip increase may also be referred to as slip modulation. In this regard, the frequency of the slip modulation depends on the use of drive unit, for example, the internal combustion engine. When using a four-stroke internal combustion engine, a frequency range of from 23 Hertz to 60 Hertz is advantageous. When using a four-cylinder/stroke engine, the use of a frequency range from about 33 Hertz to 66 Hertz is advantageous. When using a six-cylinder four-stroke internal combustion engine, the use of a frequency range from 50 Hertz to 100 Hertz is advantageous.

In a further advantageous embodiment form, it is provided that the external activation of the slip arrangement is carried out by a hydraulic unit. In case the slip arrangement is constructed as a friction disk clutch, for example, the hydraulic clutch release system can be used for this purpose in an economical manner.

The hydraulic unit can also provide at least one hydraulic pump and an active pulsator.

The active pulsator is spatially associated with the high-pressure storage.

It may also be advantageous when the active pulsator is spatially associated with the slip arrangement.

It may be further advantageous when the external activation is suitable to provide a modulation range of from 23 Hz to 50 Hz or a range of from 33 Hz to 66 Hz or a range of from 50 Hz to 100 Hz at the slip arrangement.

Further, the slip arrangement can be used as a starting element.

It may also be advantageous to provide a starting element in addition to the slip arrangement.

The slip arrangement and/or the starting element can be constructed as a friction clutch or as a multiple disk clutch or as a hydrodynamic clutch or as a disconnect clutch in hybrid drives or as a dual clutch or as a triple clutch or as a brake in conjunction with a planetary gear unit.

Further, it can be advantageously provided that the active pulsator is operated electromagnetically or piezo-electrically or is constructed as a pulsation pump. Further, rotational axis (A) and rotational axis (B) can extend coaxially or so as to be offset relative to one another. Especially in vehicles with rear-wheel drive and longitudinally mounted front engine, the two rotational axes (A) and (B) extend coaxial to one another. In a front-wheel drive with transversely mounted engine, rotational axis (A) usually extends at an offset with respect to rotational axis (B).

BRIEF DESCRIPTION OF THE DRAWINGS

The invention will be described in more detail in the following referring to diagrams. The embodiment examples shown in the drawings merely represent preferred constructions and do not limit the scope of the invention. The scope of the invention is defined uniquely by the appended claims.

The drawings show:

FIG. 3 is a deflected torque diagram;
FIG. 4 is an advantageous schematic view of a powertrain;
FIG. 5 is a preferred topology in a schematic view;
FIG. 6 is a basic wiring diagram of a slip clutch;
FIG. 7 is a deflected torque diagram.

DETAILED DESCRIPTION OF THE PRESENTLY PREFERRED EMBODIMENTS

Figure 1:
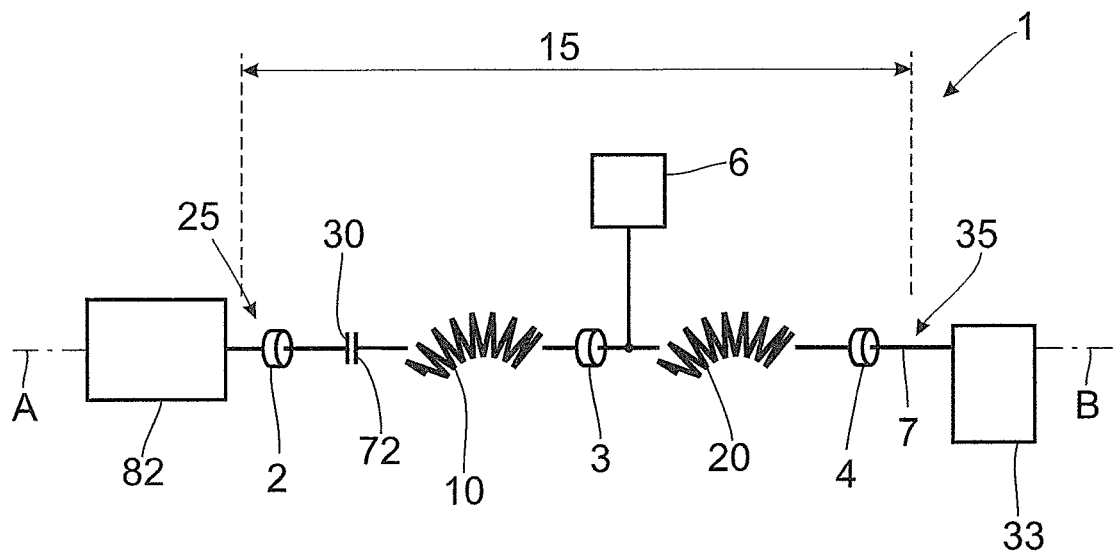
FIG. 1 is a schematic view of a powertrain as prior art.

Like or identically functioning component parts are designated by like reference numerals in the following.

Before commenting on FIG. 1, it should be noted that present-day torsional vibration decoupling systems for passenger automobiles also provide speed-adaptive dampers in addition to spring-mass arrangements, for example, a dual mass flywheel. In addition, a reduction in torque fluctuations in the internal combustion engine can be and is carried out, at least in powertrains with wet starting elements, via slip in the starting element. The technique utilized for this purpose in which a slip controller adjusts a predetermined mean slip speed is referred to in the following as "active slip mode 1". A method is presented in the following for controlling a clutch in a passenger vehicle powertrain which is designated "active slip mode 2" and which in particular shall make it possible to achieve an appreciably better decoupling at the same mean slip speed and, therefore, with the same friction losses than a slipping clutch according to the prior art or at least to achieve a level of decoupling equivalent to conventional systems while using lighter and less expensive components for pre-decoupling, for example, spring sets and mass dampers.

FIG. 1 shows a torque transmission arrangement 1 in an automatic powertrain of a motor vehicle according to the prior art containing a torsional vibration damping unit 15 with speed-adaptive damper 6. The relevant masses, stiffnesses and the starting element are arranged as follows, the depiction extending only through the transmission. The rest of the powertrain is not visible. A converter lockup clutch 72 is arranged at the input area 25 of the torsional vibration damping unit 15.

The speed-adaptive damper 6 is positioned at an intermediate mass 3 between a first spring set 10 and a second spring set 20. This topology has the following disadvantages with respect to decoupling of torsional vibration. If the converter lockup clutch 72 is operated with a clutch slip, this reduces the torque fluctuations that are conducted into the torque transmission arrangement 1. Owing to the fact that the speed of the components on the output side of the converter lockup clutch 72, and therefore also the speed of the mass damper 6, is lower by the adjusted slip speed than, for example, an engine speed of the drive unit 82, the tuning of the mass damper 6 to the engine order is no longer correct so that the mass damper 6 operates progressively worse as slip increases. The second spring set 20 provides a spring stiffness between the relatively high mass inertia of the mass damper 6 and the likewise relatively heavy transmission 33. If the mass damper 6 were linked directly to a transmission input shaft 100 then, given the moments of inertia and shaft stiffnesses that are usually present, the result would be vibrational nodes, as they are called. This means that at certain speeds, also depending on gear, the mass damper in the vibration system does not undergo any excitation and accordingly cannot establish any reaction torque and, consequently, cannot contribute to decoupling of rotational irregularities. At the corresponding speed, this manifests itself through an appreciable increase in the residual rotational irregularity (see the dashed line in the top speed area shown in FIG. 3). While this is prevented with the existing topology, an intermediate mass resonance which is unfavorable with respect to decoupling of rotational irregularities can develop through the relatively high mass moment of inertia of the intermediate mass 3 and mass damper 6 in interplay with the stiffnesses of the spring sets 10 and 20.

Figure 2:
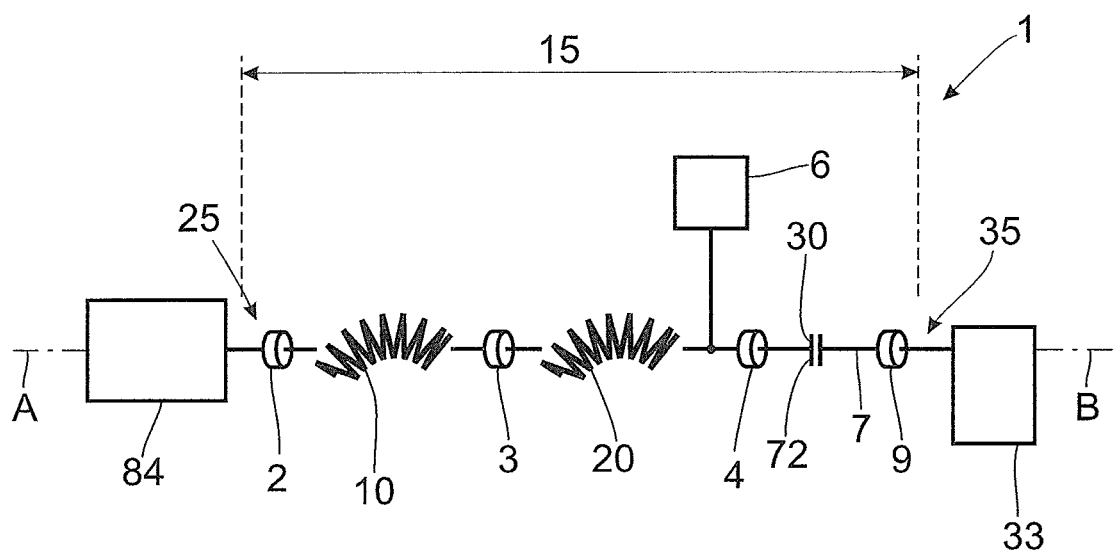
FIG. 2 is an advantageous schematic view of a powertrain.

FIG. 2 shows a more advantageous topology of the components which were shown in FIG. 1. This topology is characterized in that the second spring set 20 is arranged on the primary side with respect to the mass damper 6 resulting in the following advantages. For one, a pre-decoupling upstream of the mass damper 6 is improved by a reduction in the combined stiffness of the two series-connected spring sets 10 and 20 such that the mass damper 6 can be constructed more compactly and the system can operate supercritically already at low speeds as is clearly shown by the dash-dot line in FIG. 3. Further, the intermediate mass 3 is appreciably smaller without the link to the mass damper 6 so that no interfering intermediate mass resonance occurs in the operating range. Further, the converter lockup clutch 72 is arranged on the output side of the torque transmission arrangement 1 between the mass damper 6 and the transmission 33. This is advantageous because the order tuning of the mass damper 6 is not impaired by the clutch slip. The formation of the above-described vibrational nodes is also mitigated or prevented through the clutch slip of the converter lockup clutch 72 as is shown by the dotted line in FIG. 3.

To facilitate comparison, the arrangement shown in FIG. 2 uses basically the same schematic construction and the same quantity of subassemblies, in particular spring sets, as FIG. 1.

However, it will be appreciated that this is only exemplary. Functionally, other constructions of the torsional damper 10, 20 are also possible, inter alia as single-row or multiple-row dual mass flywheel. The mass damper 6 can also be constructed in different ways, particularly advantageously as a Sarrazin type, Salomon type, or DFTvar type speed-adaptive mass damper.

FIG. 3 shows the deflected torque over speed of a prior art torque transmission system, one variant without slip and one variant with slip mode 2.

FIG. 4 shows a further topology arrangement as has already been described in FIGS. 1 and 2, but with only one spring set 10, in this case as a dual mass flywheel with a one-row spring set.

FIG. 5 shows an advantageous topology for torsional vibration reduction in the powertrain. Pre-decoupling of rotational irregularities refers here to a system which reduces the rotational irregularity upstream of the slippable clutch 30. As in the concrete example given above, this can comprise an arrangement of torsion springs, masses and mass dampers. However, other principles are also possible such as, for example, a rotational irregularity decoupling with two parallel torque transmission paths and a coupling arrangement, a gas spring torsional damper, or an arrangement of centrifugal springs.

The required slippable clutch 30 can also be a starting clutch simultaneously. However, this is not absolutely necessary. The starting clutch can otherwise be placed at any other position in the powertrain. However, the slippable clutch can just as easily be one or more clutches of the transmission which, depending on gear, perform tasks in gear shifting and/or decoupling of rotational irregularities by slipping. The type of transmission, for example, automatic transmission (AT), dual clutch transmission (DCT), automated manual transmission (AMT), shiftless transmission or manual transmission (MT) and the construction of the powertrain as front-wheel, rear-wheel or all-wheel drive, also in hybrid construction, are optional. Particularly in MT and DCT transmissions the described topology is already standard, but not in combination with AT transmissions. However, particularly in manual transmissions but also in dry dual clutch transmissions the starting clutch used is not suitable over the long term for performing a function for rotational irregularity decoupling through slip. To this extent also, the suggested construction is novel for these powertrains.

FIG. 6 shows a simplified schematic diagram of a slippable clutch 30 according to an improved method, namely, clutch slip mode 2.

A substantially improved decoupling can be achieved even at low speed with the above-described topology with identical stiffness values of the spring set 10, 20, and even clutch slip mode 1 acts to further improve decoupling or to prevent vibrational nodes. However, the clutch slip generally leads to friction losses which can take on unacceptable values at high engine torque and high slip speed. Increasing fuel consumption and, therefore, $CO_2$ exhaust and the generated friction heat which must be dissipated have a limiting effect in this case.

An object of the present invention is to enhance the decoupling effect of slip at low slip speed. This is achieved in that the torque which is transmittable by the clutch is actively modulated. For this reason, this process is called active slip mode 2. A force that is adjusted by a slip controller in order to achieve a determined mean speed difference between an input side 31 of the slip arrangement 30 and an output side 32 of the slip arrangement 30 is designated by F0. At a stationary operating point, F0 may be considered constant. To this extent, the transmittable torque of the slip clutch 30 is calculated as:

$$M\_tr = F\_0 \cdot r \cdot \mu(n\_slip),$$

where
r=mean friction radius
μ=friction coefficient of clutch linings which depends on the slip speed n_slip.

Fa(α,) designates an additional force whose amplitude depends on a reference angle α and a phase shift β. The dependency can be given by a sine function, for example. The reference angle can be, for example, the crankshaft position. For tuning to the main engine order in a four-cylinder four-stroke engine, this would mean:

$$F\_a(\alpha,\beta) = F\_a \cdot \sin(2a+\beta)$$

Accordingly, the transmittable torque is calculated as:

$$M\_tr = [\![F]\!]\_0 + F\_a \cdot \sin(2a+\beta)] \cdot r \cdot \mu(n\_slip).$$

FIG. 7 shows the effect of the modulation of the clutch torque on the torsional vibration decoupling of the main engine order. Compared to slip mode 1, the rotational irregularity is once again substantially reduced by slip mode 2 at the same mean slip speed and with correspondingly identical friction losses.

Figure 8:
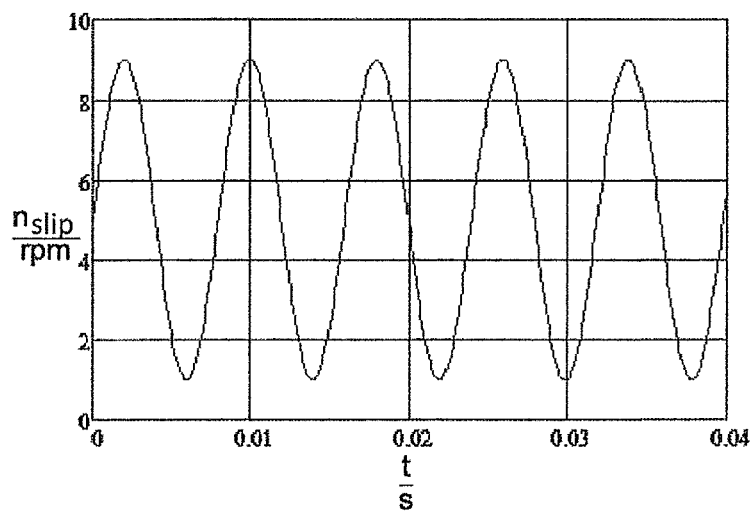
FIG. 8 is a slip speed plotted over time.
Figure 9:
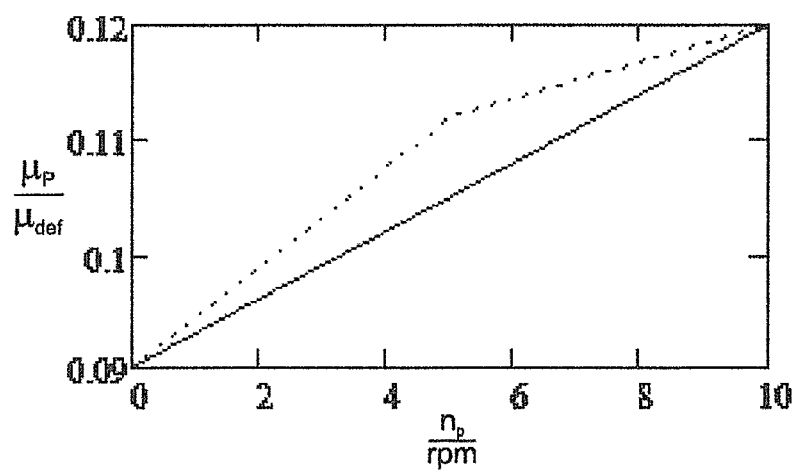
FIG. 9 is a friction coefficient plotted over slip speed.
Figure 10:
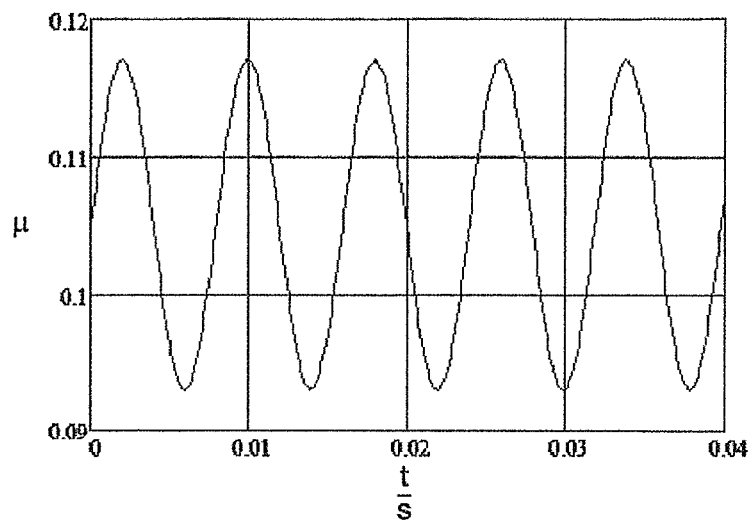
FIG. 10 is a friction coefficient plotted over time.

FIGS. 8, 9 and 10 illustrate how the functioning of active slip mode 2 is derived. Because of nonlinear relationships and non-harmonic excitation in the actual powertrain, the way the modulation of the transmittable clutch torque works in relation to the decoupling of rotational irregularities can only be graphically derived under highly simplified conditions. To this end, let it be assumed that a rotational irregularity at the input side of the clutch is purely sinusoidal in the main order, in this case the first engine order. At a constant clutch force F0, there is in this example a mean slip of 5 RPM which oscillates around the mean value with an amplitude of 4 RPM (compare FIG. 8). The curve of the friction coefficient of the slip clutch over slip is linearized in this area, which is represented by the solid line in FIG. 9. Accordingly, a sinusoidal curve over time also results for the friction coefficient as is shown in FIG. 10. The mean friction coefficient in this case is μ_0=0.105 and the amplitude is μ_a=0.012.

For the transmittable torque with modulation in the main order, in turn:

$$M\_tr = [\![F]\!]\_0 + F\_a \cdot \sin(a+\beta)] \cdot r \cdot [\mu\_0 + \mu\_a \cdot \sin(\alpha)].$$

Angle α is calculated as α=2·π·n·t, where n=speed and t=time.
With an optimal phase shift β=180°=π, it follows: sin(α+π)=sin(α).
Through expansion of M_tr:

$$M\_tr = r \cdot [F\_0\mu\_0 + (F\_0\mu\_a - F\_a\mu\_0)\sin(\alpha) - F\_a\mu\_a \sin^2[\![(\alpha)]\!]].$$

With $\sin^2[(\alpha)=\frac{1}{2}(1-\cos(2\alpha))]$, it follows:

$$M\_tr = r \cdot [[F]]\_0\mu\_0 - (F\_a\mu\_a)/2) + (F\_0\mu\_a - F\_a\mu\_0)\sin(\alpha) + (F\_a\mu\_a)/2 \cos(2\alpha)]$$

The summands in the square brackets of this term can be assigned to different orders:

Zeroth order: $F\_0\mu\_0 - (F\_a\mu\_a)/2$

Mean Torque

To obtain the same mean transmittable torque, different forces F_0 are necessary (adjusted by the slip controller) for different subtrahends (F_a μ_a)/2.

$(F\_0\mu\_a - F\_a\mu\_0)\sin(\alpha)$  First order:

Main Order in this Example

Can be completely canceled under the simplified assumptions in the choice of $F\_a = (F\_0\mu\_a)\mu\_0$. The effect of the invention is grounded in this.

$(F\_a\mu\_a)/2 \cos(2\alpha)$  Second order:

The modulation results in a new order with doubled modulation frequency. However, the amplitude of this order is comparatively small and, in addition, higher orders of the powertrain are damped better than lower orders so that the positive effect of reducing the main order is preponderant. This derivation is a highly simplified model. Because conditions diverge from real-world conditions, a complete cancellation of the main engine order is impossible in practice with this method, but an appreciable reduction is possible as can be seen from FIG. 7.

The function of the clutch slip with active modulation, i.e., clutch slip mode 2, is determined by the following parameters.

Figure 11:
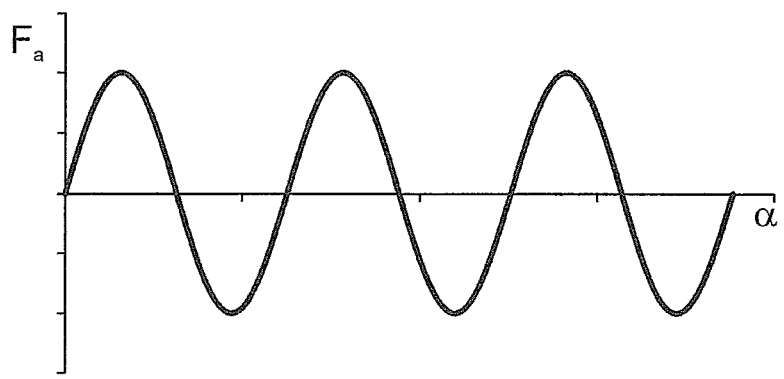
FIG. 11 is a diagram of sine wave of Fa.
Figure 12:
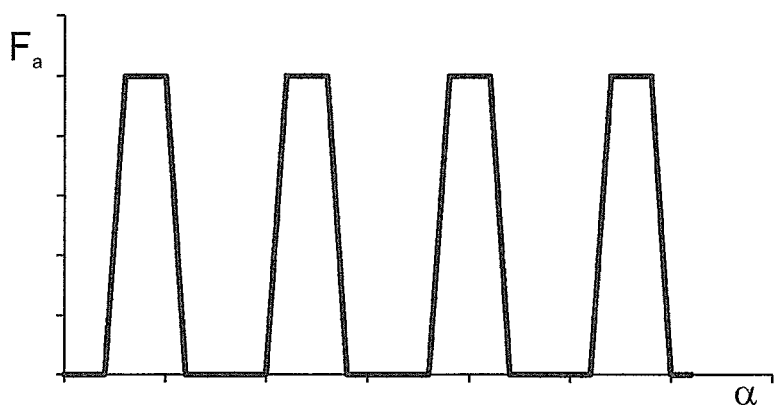
FIG. 12 is a diagram of trapezoidal wave of Fa.
Figure 13:
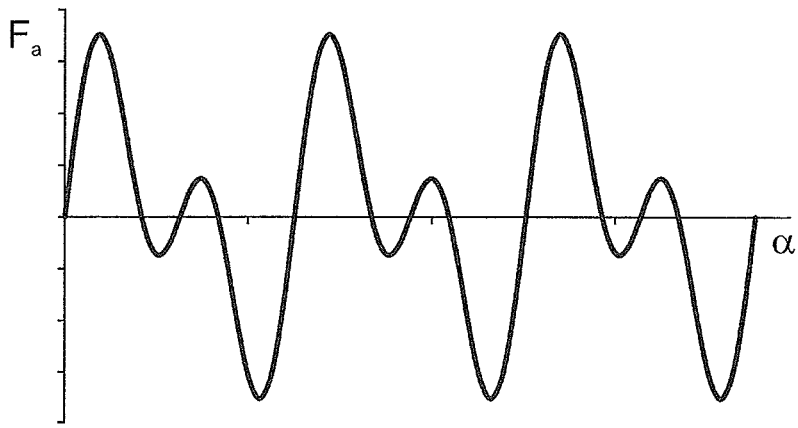
FIG. 13 is a diagram of sine wave of Fa of higher order.

One parameter is the vibration mode. The optimal curve of the transmittable clutch torque over time depends on the curve of the rotational irregularity of the main order at the clutch input. In the preceding example, the assumed excitation was purely sinusoidal as was the optimal curve of the modulated clutch force. In an actual powertrain, the main order of the alternating torque at the clutch input which has already been pre-decoupled has an at least approximately sinusoidal shape so that the modulation of the clutch torque can also be described by a sine function in this case in order to achieve good results as is shown in FIG. 11. However, other harmonic and non-harmonic functions can also be taken as a basis such as, for example, a trapezoidal curve as is shown in FIG. 12. The vibration mode can also be optimized to reduce a plurality of engine orders. In a simple case, this is possible in that the modulation is described by a superposition of two sine oscillations, where one sine oscillation has the firing frequency, for example, and the other has the doubled firing frequency.

However, dividing the actuating force of the clutch into a force F0 which is predefined via the slip controller and constant at the stationary operating point and a dynamic force Fa for modulation of the transmittable torque is mainly a conceptual model for describing the working principle of the invention. It is a matter of design implementation whether two forces are actually superimposed, e.g., in the sense of two separate actuators, whether the force that an individual actuator applies to the clutch is varied in a corresponding manner, or whether combination forms are used.

What is decisive for the method is only that the transmittable torque of the clutch is changed dynamically in a suitable form and with suitable parameters. For tuning to the main engine order, the modulation frequency must correspond to the firing frequency of the internal combustion engine. Therefore, it increases as a function of engine speed. In a 3-cylinder 4-stroke engine, for example, for the speed range from 1000 RPM to 2000 RPM, a modulation frequency of 25 Hz to 50 Hz is necessary. In engines with cylinder deactivation, it is particularly advantageous when the adjustment of slip actuation allows switching between the orders of the full range and the deactivation range. Configuring to higher orders or a combined configuration to a plurality of orders is also possible.

The optimal phase of the modulation amounts to 180° in relation to the vibration of the input speed of the slip arrangement as has already been described above in the theoretical derivation of the function. Phase shifts in the range of 180°±45° are particularly advantageous. If the phase shift is too small, the rotational irregularity is magnified and reaches a maximum at phase equality.

Figure 14:
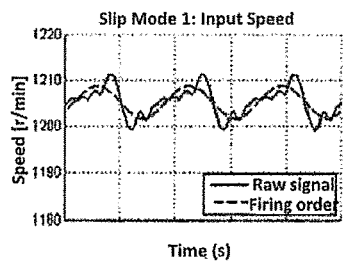
FIG. 14 is a further diagrams.
Figure 14:
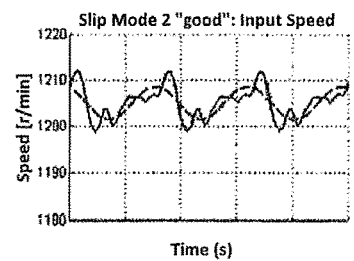
Figure 14:
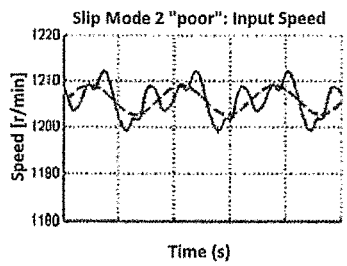
Figure 14:
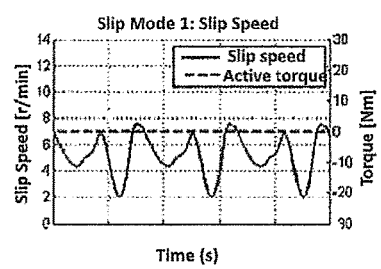
Figure 14:
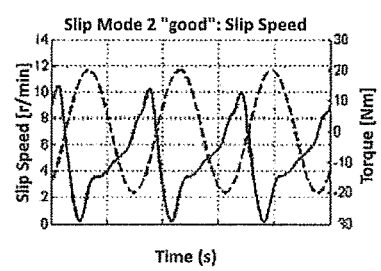
Figure 14:
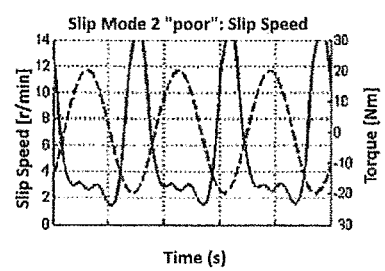
Figure 14:
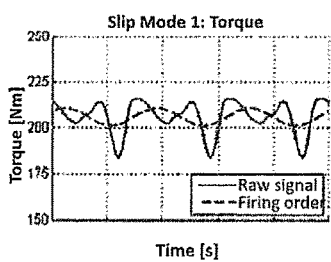
Figure 14:
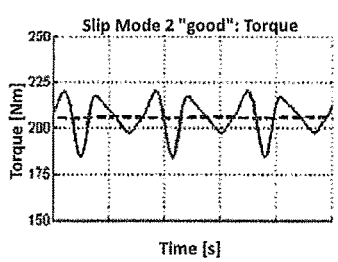
Figure 14:
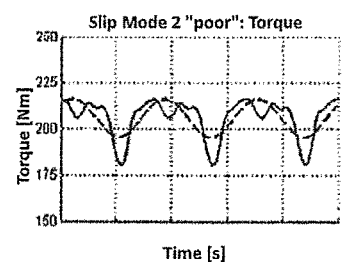

FIG. 14 shows different values in the powertrain of a motor vehicle according to FIG. 4 for three different cases:

Column 1: slip mode 1
Column 2: slip mode 2—phase in a favorable range
Column 3: slip mode 2—phase in an unfavorable range.

The speed at the input area 31 of the slip clutch 30 is shown in each instance in the top line. Owing to the rotational irregularity of the internal combustion engine, the speed fluctuates around a mean speed, in this case ~1205 RPM, in spite of pre-decoupling, e.g., through a DMF and a speed-adaptive damper 6 (compare this arrangement with the constructions in FIGS. 5 and 6). For the sake of clarity, the oscillation of the speed in an engine firing order is also shown in addition to the raw signal. This can be determined by a fast Fourier transformation from the time curve of the total vibration.

The slip speed ns between the input side 31 and output side 32 of the slip clutch 30 and the active torque Ma are shown in the second line. The active torque Ma is directly proportional to the above-mentioned active force component Fa and is calculated as: $M\_a = F\_a \cdot r \cdot \mu$.

In the active slip mode 1 in column 1, force Fa and therefore also torque Ma are equal to zero. Accordingly, the occurring slip curve is the result of the actuating force F0 adjusted by the slip controller to obtain a mean slip (in this case 5 l/min), the curve of excitation, i.e., the speed fluctuation or torque fluctuation at the clutch, and the curve of the friction coefficient of the clutch over slip speed.

In active slip mode 2, a sine curve of force component Fa and of active torque Ma with a determined amplitude and with the firing frequency of the internal combustion engine is given in columns 2 and 3.

In column 2, the phase relation of the curve of the active torque Ma to the curve of the speed upstream of the clutch in firing order in the diagram amounts to approximately 180°. In other words, in the time domains in which the speed fluctuation in firing order has minima, the active torque Ma has a maxima, and vice versa. This shows an optimized tuning of active slip mode 2.

An unfavorable case in which the active torque runs approximately in phase with the speed at the input area of the clutch is shown in column 3.

The diagrams in line 3 again show the torque transmitted by the clutch as original raw signal and as the component thereof in engine firing order. It will be appreciated that the irregularity in the torque in the main engine order is almost completely rectified with active slip mode 2 with optimized phase (see column 2). With the unfavorable phase (see column 3), the amplitude of the torque irregularity is increased even further relative to active slip mode 1 (see column 1).

However, the phase of the modulation need not be exactly 180° in relation to the speed at the input of the slip mechanism to achieve a positive effect. In order to achieve an improvement over active slip mode 1, it is advantageous when the phase shift is in the range of 180°±45°.

Figure 15:
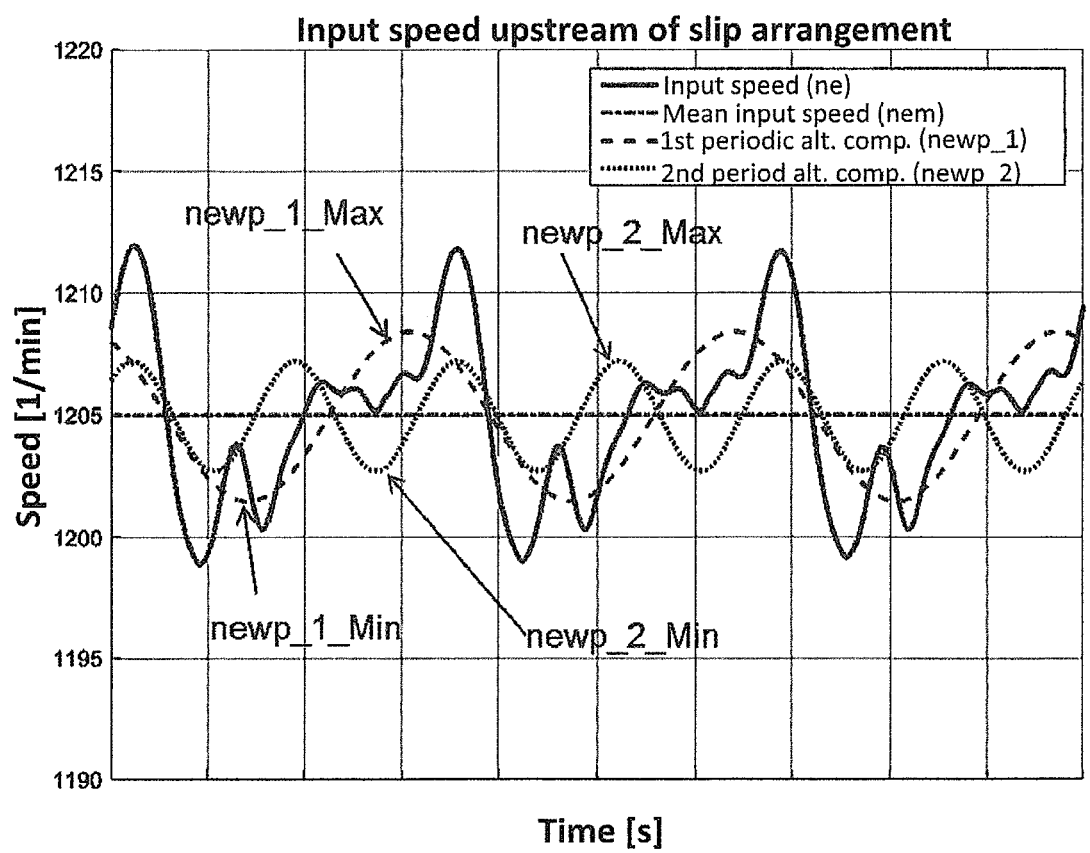
FIG. 15 is a diagram of input speed at the slip arrangement at an operating point.

FIG. 15 shows the speed curve in the input area 31 of the slip arrangement 30 as is also shown in FIG. 14, middle column, top line, for a static operating point.

The input speed (ne) has a mean value (nem), in this case 1205 1/min, around which an alternating component (new), not shown here, oscillates because it is congruent with the curve of ne. The curve of the alternating component substantially depends upon the character of the internal combustion engine 82, in particular the quantity of cylinders, and the pre-decoupling. The alternating component can be described by means of a fast Fourier transforms (FFT) approximately as superposed sinusoidal oscillations (newp_i). The lowest frequency of a periodic partial oscillation of the alternating component of this kind is the firing frequency of the engine. The frequencies of further harmonic oscillations have a whole number ratio with the firing order. In an actual powertrain, vibration components can also occur with a non-whole number relationship with the firing frequency, but this will not be dealt with here. The periodic alternating components in the main engine order (newp_1) and in doubled main engine order (newp_2) are shown by way of example in FIG. 15. The amplitudes of the alternating components fluctuate between a minimum (newp_i_Min) and a maximum (newp_i_Max). The curve of an alternating component of this kind is a reference quantity for the phase shift β of the modulation of the activation of the slip arrangement in order to achieve a reduction in rotational irregularity in the corresponding engine order.

There is an optimal amplitude of the active torque Ma which depends predominantly on the mean engine torque of zeroth order and the mean slip speed. There is an approximately linear relationship between the optimal amplitude and the mean torque in different load states. Amplitudes of modulation of the torque which can be transmitted by the slip arrangement of between 5% and 15% of the mean engine torque are particularly suitable.

Figure 16:
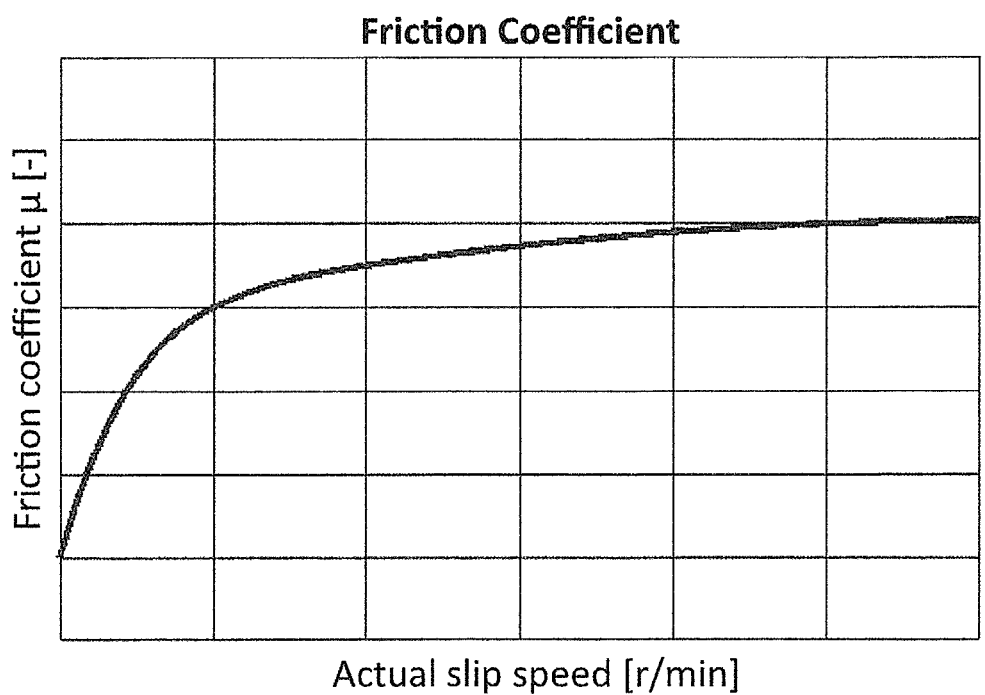
FIG. 16 is a friction coefficient plotted over slip.

The efficiently operative friction coefficient particularly of a wet friction clutch such as is commonly used in motor vehicle powertrains depends on the instantaneous differential speed between the input and the output of the clutch. Usually, the curve is significantly adapted through additives in the oil and through the material and geometry of the linings so as to result in a degressive slope over the slip speed. A typical friction coefficient curve is shown in FIG. 16.

For the slip clutch proposed herein, it is particularly advantageous when the friction coefficient lies in a range of between 0.05 and 0.15 and rises steeply up to a highest possible slip speed. Slopes of the friction coefficient over speed of between 0.001/RPM and 0.005/RPM in a slip range up to 30 RPM are particularly favorable. The mean slip speed is adjusted by a slip controller. Since slip generally causes friction losses, which must be dissipated in the form of heat energy, a smallest possible mean slip speed is aimed for. Mean slip speeds of less than or equal to 30 RPM, particularly advantageously less than or equal to 10 RPM, are advantageous for the actively modulated slip.

Active slip mode 2 brings about an appreciable improvement in decoupling compared to the known slip mode 1 primarily in the low to medium speed range. This has the advantage of reduced expenditure in the control and actuation of the slip clutch. Particularly at high speed and depending on the vibration behavior of the powertrain, no slip may be necessary in certain operating states for the decoupling of rotational irregularities. Therefore, it is useful to implement a needs-based operating strategy. This can be based on the following schema:

|  | Low Speed | Medium Speed | High Speed |
| --- | --- | --- | --- |
| High Load | slip mode 2 | slip mode 2 | slip mode 1 |
| Medium Load | slip mode 2 | slip mode 1 | no slip |
| Low Load | slip mode 1 | no slip | no slip |

Particular operating states such as gear-dependent vibrational nodes, starting or resonances are likewise to be taken into account.

Figure 17:
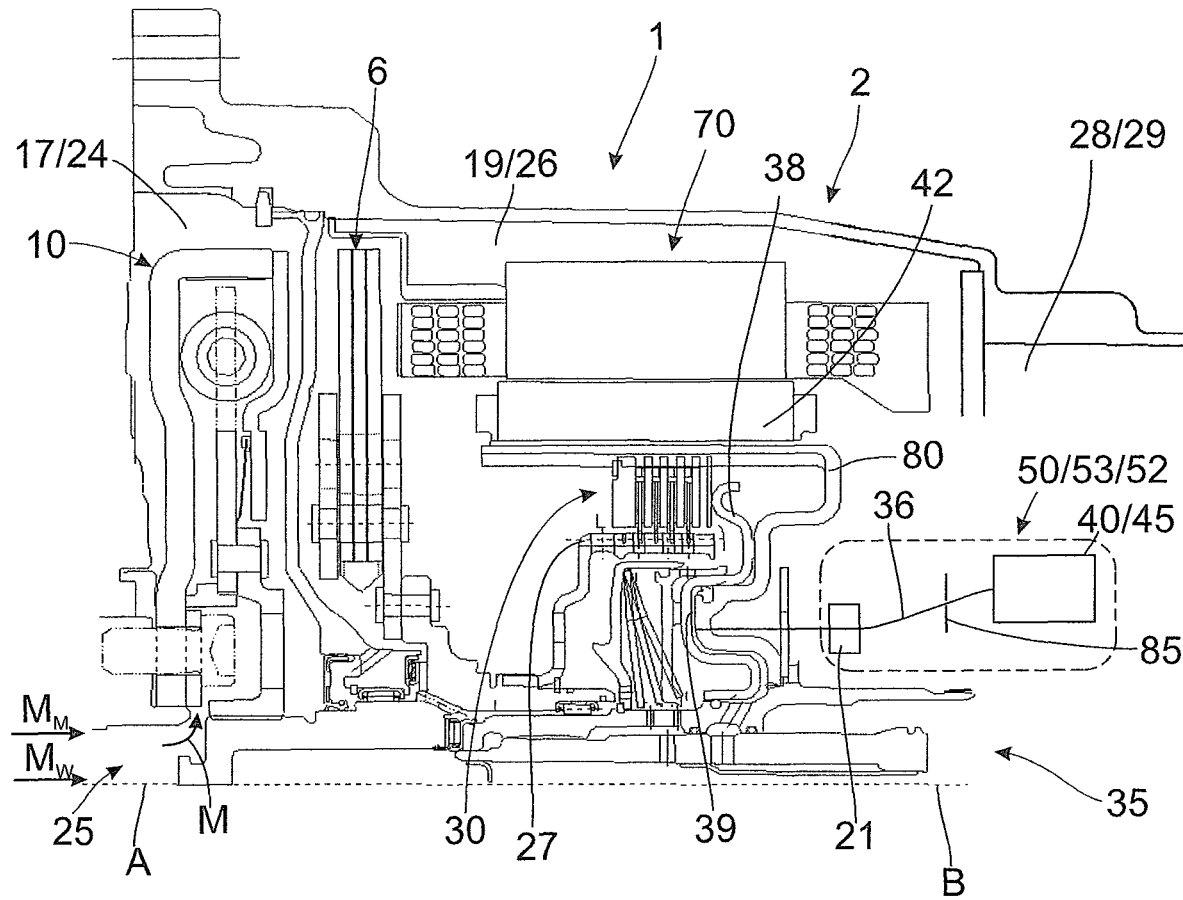
FIG. 17 is a torque transmission arrangement for an automatic hybrid transmission with leakage valve.

FIG. 17 shows a torque transmission arrangement 1 for an automatic hybrid transmission 2. A basic construction is as follows in sequence of a torque path M, a mean torque Mm with superposed alternating torques Mw, from an input area 25, which can be formed, for example, by an internal combustion engine, to an output area 35 that can be formed, for example, by an output shaft of a transmission. The torque transmission arrangement 1 is divided into three spatial areas. A first spatial area 17, which may also be referred to as a dry space 24, a subsequent second spatial area 19, which may also be referred to as a moist space 26, and a subsequent third spatial area 28, which may also be referred to as a wet space 29. A first torsional damper 10 is located in the first spatial area 17 and is constructed as a dual mass flywheel. The latter can be operated with a grease filling and is preferably placed in the dry space 24 in which no viscous medium is contained. Following the dual mass flywheel 10 is a speed-adaptive damper 6 arranged in the second spatial area 19. This is located in the oil mist-containing working chamber 26. This variant has the advantages of an efficient, economical use of installation space and a resulting high quality in the decoupling of rotational irregularities which are introduced by the drive unit 82, for example, the internal combustion engine. A slip arrangement 30 in the form of a multiple disk clutch is arranged subsequently. An inner disk carrier 27 is connected to the damper unit 6 so as to be fixed with respect to rotation relative to it. An outer disk carrier 80 of the slip arrangement 30 is connected to the output area 35 so as to be fixed with respect to rotation relative to it. Further, a rotor 42 of an electric drive unit 70 which is used in this instance as hybrid motor is connected to the outer disk carrier 28. A release piston 38 of the slip arrangement 30 is compressively acted upon by a hydraulic working chamber 39. The hydraulic working chamber 39 is operatively connected to an external activation 40; 45 which is provided in this instance as a hydraulic unit 50 with a hydraulic pump 53 and a high-pressure storage 52. A pressure line 36 and an active pulsator 21 are provided between the hydraulic unit 50 and the working chamber 39 of the slip arrangement 30. The active pulsator 21 can be, for example, an electromagnetically operated or piezo-electrically operated pulsator or can also be constructed supportively as an axially oscillatable spring-mass system, for example.

Further, the pressure pulsation can be generated by additional pulsation pumps arranged parallel to the line, for example, small electric motors with cam-operated axial cylinders whose pulsation frequency is adjustable via the speed of the driving electric motor. In this way, a quite inexpensive actuating system can be formed without requiring changes to the hydraulic unit 50, which is usually present in any case for controlling the slip clutch 30, which can also be used here as a starting clutch and also an existing pressure line 36. A reinforcing, very stiff clutch construction contributes to the control precision. A sensing of the torque peaks until the triggering of the active pulsator is to be carried out separately. The slip arrangement can be clutches as shared system elements, for example, disconnect clutches in a hybrid system which may be arranged in the torque path, for example, downstream of a rotational irregularity mitigation system as well as radially inside of an electric machine as is shown in this instance, or startup-capable clutches comparably arranged, also, for example, in a hydrodynamically cooled clutch (HCC) construction, or a dual clutch or a triple clutch which unites the functions of dual clutch and KO clutch, i.e., a clutch which switches the electric motor of a hybrid drive on and off, or one or more—if necessary, depending on the torque path in the transmission in the various gears—transmission-internal clutches or brakes which are operated to actively slip. One of the utilized clutches or brakes can be an integrated starting element. In this case, the slip arrangement 30 is to be controlled by the hydraulic unit 50 via the active pulsator 21 so as to enable a high-frequency variable slip modulation superposed on the heretofore customary setting of a constant slip. High-frequency is, for example, a frequency range of approximately 23 Hz to 50 Hz with 3 cylinders, approximately 33 Hz to 66 Hz with 4 cylinders and 50 Hz to 100 Hz with 6 cylinders. The high-frequency variable slip modulation filters out the residual rotational irregularities still remaining downstream of a torsional damping device such as, in this case, the dual mass flywheel 10 and the damper unit 6. As concerns operation, reference is made to the description referring to FIGS. 1 to 16.

Figure 18:
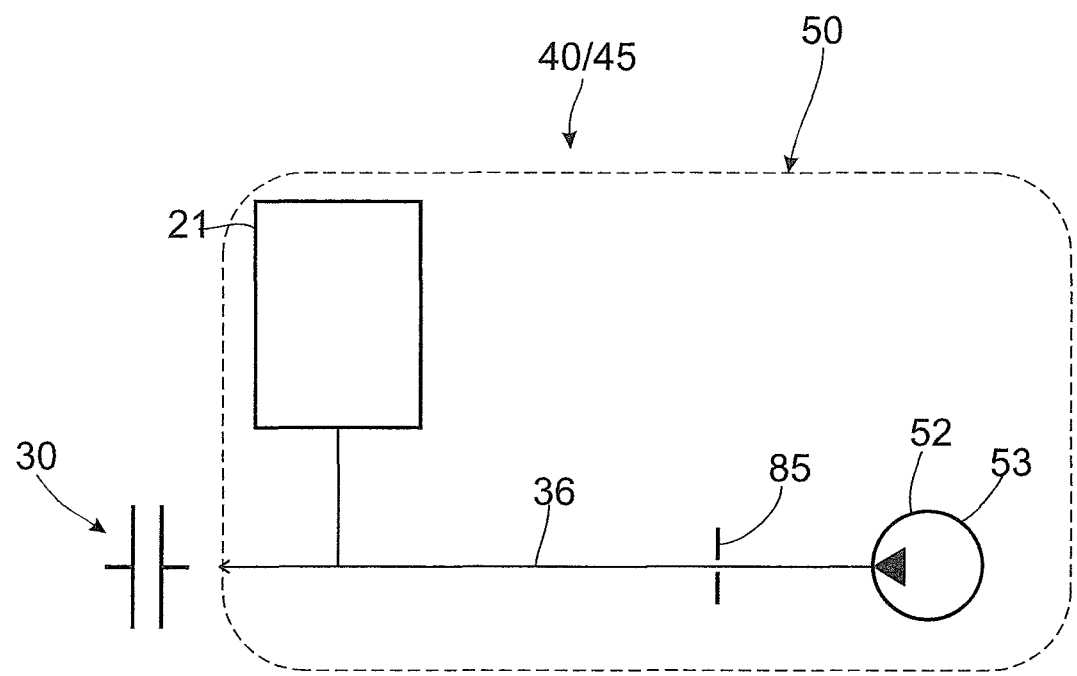
FIG. 18 is a schematic view of a method arrangement according to the invention.

FIG. 18 shows a schematic view of a control, according to one aspect of the invention, of a slip arrangement 30 shown here as a friction disk clutch. A hydraulic unit 50, which is used in this case as an external activator 40, 45 and comprises a hydraulic pump 53 and a high-pressure storage 52, generates a hydraulic basic pressure that acts on the slip arrangement/slip clutch 30, and the slip clutch 30 can consequently transmit a required torque. An additional active pulsator 21, which is operable at high frequency, is provided as an external activation 40; 45 in a pressure line 36 to the clutch 30 in addition to a clutch pressure control valve, which operates at low frequency, adjusts the base pressure for the required torque and for the required static clutch slip. This active pulsator 21 should optimally be arranged at the end of the line, i.e., immediately in front of, or in, the clutch 30, for the benefit of control precision and for reducing construction costs.

A diaphragm 24, which serves here as an example of a low-pass filter, is installed between the transmission oil pump 53 and transmission hydraulics in a hydraulic line 36 to the active pulsator.

The slip clutch 30 is controlled so as to enable a high-frequency variable slip modulation superposed on the heretofore customary setting of a constant slip. High-frequency is, for example, a frequency range of approximately 23 Hz to 50 Hz with 3 cylinders, approximately 33 Hz to 66 Hz with 4 cylinders and 50 Hz to 100 Hz with 6 cylinders. The high-frequency variable slip modulation filters out the residual rotational irregularities still remaining downstream of a torsional damping device such as a dual mass flywheel and/or a damper unit, neither of which is shown.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for transmission and damping of a mean torque (Mm) with a superposed alternating torque (Mw) in a torque transmission arrangement for a powertrain of a motor vehicle having an input area and an output area, comprising:
   transmitting the mean torque (Mm) with the superposed alternating torque (Mw) along a torque path (M) from the input area to the output area;
   rotating the input area of the torque transmission arrangement at an input speed (ne) around a first rotational axis (A), wherein at least the input speed (ne) is composed of a mean speed (nem) and a superposed alternating component (newp);
   rotating the output area of the torque transmission arrangement at an output speed (na) around a second rotational axis (B);
   wherein an alternating component (new) is approximately a superposition of periodic speed oscillations (newp_i) whose frequencies (f) have a whole number ratio (i) with a firing frequency (Zf);
   wherein each periodic speed oscillation (newp_i) has a minimum (newp_i_Min) and a maximum (newp_i_Max);
   providing a slip arrangement in the torque path (M) between the input area and the output area configured to:
      transmit the mean torque (Mm) with the superposed alternating torque (Mw) and generate a speed slip (ns) between the input speed (ne) and the output speed (na),
   providing, by the slip arrangement, a maximum of an external activation of the speed slip (ns) in an area of the maxima (newp_i_Max) of at least one periodic oscillation component (newp_i) of the superposed alternating component (newp); and
   providing, by the slip arrangement, a minimum of the external activation of the speed slip (ns) in an area of the minima (newp_i_Min) of the at least one periodic oscillation component (newp_i) of the superposed alternating component (newp).

2. The method according to claim 1, wherein the external activation of the slip arrangement is carried out by a hydraulic unit.

3. The method according to claim 2, wherein the hydraulic unit provides at least one hydraulic pump and an active pulsator.

4. The method according to claim 3, wherein the active pulsator is spatially associated with the hydraulic pump.

5. The method according to claim 3, wherein the active pulsator is spatially associated with the slip arrangement.

6. The method according to claim 1, wherein the external activation is configured to provide a modulation range at the slip arrangement of one of:
from 23 Hz to 50 Hz,
from 33 Hz to 66 Hz, or
from 50 Hz to 100 Hz.

7. The method according to claim 1, wherein the slip arrangement is a starting element.

8. The method according to claim 1, wherein a starting element is provided in addition to the slip arrangement.

9. The method according to claim 7, wherein the slip arrangement is one of a friction clutch, a multiple disk clutch, a hydrodynamic clutch, a disconnect clutch in a hybrid drive, a dual clutch, or a triple clutch or a brake in conjunction with a planetary gear unit.

10. The method according to claim 3, wherein the active pulsator is one of:
operated electromagnetically, operated piezo-electrically, or constructed as a pulsation pump.

11. The method according to claim 1, wherein the first rotational axis (A) and the second rotational axis (B) one of:
extend coaxially,
extend so as to be offset relative to one another.

12. The method according to claim 8, wherein at least one of the slip arrangement and the starting element is one of a friction clutch, a multiple disk clutch, a hydrodynamic clutch, a disconnect clutch in a hybrid drive, a dual clutch, or a triple clutch or a brake in conjunction with a planetary gear unit.

* * * * *